(12) United States Patent
Hung et al.

(10) Patent No.: US 8,247,614 B2
(45) Date of Patent: Aug. 21, 2012

(54) COPOLYCONDENSATION POLYMERIZATION OF FLUOROPOLYMERS

(75) Inventors: Ming-Hong Hung, Wilmington, DE (US); Bruno Ameduri, Montpellier (FR); Bernard Boutevin, Montpellier (FR); Aurelien Soules, Capestang (FR)

(73) Assignees: E I du Pont de Nemours and Company, Wilmington, DE (US); Le Centre National de la Recherche Scientifique

( * ) Notice: Subject to any disclaimer, the term of this patent is extended or adjusted under 35 U.S.C. 154(b) by 457 days.

(21) Appl. No.: 12/486,378

(22) Filed: Jun. 17, 2009

(65) Prior Publication Data
US 2010/0324234 A1 Dec. 23, 2010

(51) Int. Cl.
*C08G 63/44* (2006.01)
*C08G 73/00* (2006.01)

(52) U.S. Cl. ........ 568/362; 528/361; 528/368; 528/391; 528/401; 528/422; 528/425; 568/615

(58) Field of Classification Search ................. 528/361, 528/362, 368, 391, 401, 422, 425; 568/615
See application file for complete search history.

(56) References Cited

U.S. PATENT DOCUMENTS

| | | | |
|---|---|---|---|
| 2,515,246 A | | 7/1950 | McBee et al. |
| 3,086,946 A | * | 4/1963 | Brown .......................... 528/401 |
| 3,347,901 A | * | 10/1967 | Fritz et al. ...................... 558/447 |
| 3,386,968 A | * | 6/1968 | Carpenter ...................... 528/362 |
| 4,020,176 A | | 4/1977 | Greenwald |
| 4,361,678 A | | 11/1982 | Tatemoto et al. |
| 4,973,716 A | * | 11/1990 | Calini et al. ................... 549/504 |
| 6,365,693 B1 | | 4/2002 | Hung |
| 7,829,659 B2 | * | 11/2010 | Grabstein et al. ............. 528/417 |
| 2008/0311412 A1 | * | 12/2008 | Fokin et al. .................... 428/457 |
| 2009/0069569 A1 | * | 3/2009 | Nolan et al. ................... 548/255 |
| 2009/0105435 A1 | | 4/2009 | Hung et al. |
| 2009/0326192 A1 | * | 12/2009 | Nash et al. ..................... 530/317 |
| 2010/0125120 A1 | * | 5/2010 | Crandall et al. .............. 524/550 |

FOREIGN PATENT DOCUMENTS

JP 63225347 A * 9/1988

OTHER PUBLICATIONS

Zhu et al., "Novel perfluorocyclobutyl (PFCB)-containing polymers formed by click chemistry", Polymer, 2006, 47, pp. 6272-6279.*
Rostovstev et al., "A Stepwise Huisgen Cycloaddition Process: Copper(I)-Catalyzed Regioselective "Ligation" of Azides and Terminal Alkynes", Angew. Chem. Int. Ed., 2002, 41, pp. 2596-2599.*
van Steenis et al., "Click-chemistry as an efficient synthetic tool for the preparation of novel conjugated polymers", Chem. Commun., 2005, pp. 4333-4335.*
Zhai et al., "Synthesis of fluorinated polyemr electroyle membranes by radiation grafting and atom transfer radical polymerization techniques", Polymer, 2009, pp. 1159-1165.*
Lewis et al., "Discovery and Characterization of Catalysts for Azide-Alkyne Cycloaddtion by Fluorescence Quenching", J. Am. Chem. Soc., 2004, 126, pp. 9152-9153.*
Anestis L. Logothetis, Chemistry of Fluorocarbon Elastomers, Prog. Polym. Sci, 1989, pp. 251-296, vol. 14, Pergamon Press plc, Great Britain.
Kurt Baum, Clifford D. Bedford, and Ronald J. Hunadi, Synthesis of Fluorinated Acetylenes, J. Org. Chem., 1982, pp. 2251-2257, vol. 47, American Chemical Society.
Hartmuth C. Kolb, M. G. Finn, K. Barry Sharpless, Click Chemistry: Diverse Chemical Function from a Few Good Reactions, Angewandte Chemie Int. Ed., 2001, pp. 2004-2021, vol. 40(11), Wiley-VCH, Verlag GmbH.
Jean-Francois Lutz, Hans G. Borner, Katja Weichenhan, Combining Atom Transfer Radical Polymerization and Click Chemistry: A Versatile Method for the Preparation of End-Functional Polymers, Macromol. Rapid Commun,, 2005, pp. 514-518, vol. 26(7), Wiley-VCH, Verlag GmbH & Co.
Jean-Francois Lutz, 1,3-Dipolar Cycloadditions of Azides and Alkynes: A Universal Litigation Tool in Polymer and Materials Science, Angewandte Chemie Int. Ed., 2007, pp. 1018-1025, vol. 46(7), Wiley-VCH, Verlag GmbH & Co. KGaA, Weinheim.
A. Manseri, B. Ameduri, B. Boutevin, M. Kotora, M. Hajek, G. Caporiccio, Synthesis of telechelic dienes from fluorinated a,w-diiodoalkanes. Part I. Divinyl and diallyl derivatives from model I(C2F4)nl compounds, Journal of Fluorine Chemistry, 1995, pp. 151-158, vol. 73(2), Elsevier Science S.A.
A. A. Malik, D. Tzeng, P. Cheng, K. Baum, Synthesis of Fluorinated Diisocyanates, J. Org. Chem., 1991, pp. 3043-3044, vol. 56(9), American Chemical Society.

* cited by examiner

*Primary Examiner* — Mark Eashoo
*Assistant Examiner* — Nicole M Buie-Hatcher

(57) ABSTRACT

Fluorinated copolymers are prepared via copolycondensation polymerization in a process comprising reacting A) a telechelic fluoroazido compound of formula $N_3(Y)_p$—$(CH_2)_n$—R—$(CH_2)_m$—$(Y)_pN_3$, wherein Y is SO, $SO_2$, $C_6H_4$, or CO, p=0 or 1, n and m are independently 1 to 4, and R is selected from the group consisting of i) a $C_3$-$C_{10}$ fluoroalkylene group, ii) a $C_3$-$C_{10}$ fluoroalkoxylene group, iii) a substituted aryl group, iv) an oligomer comprising copolymerized units of vinylidene fluoride and perfluoro(methyl vinyl ether), v) an oligomer comprising copolymerized units of vinylidene fluoride and hexafluoropropylene, vi) an oligomer comprising copolymerized units of tetrafluoroethylene and perfluoro(methyl vinyl ether), and vii) an oligomer comprising copolymerized units of tetrafluoroethylene and a hydrocarbon olefin with B) a telechelic diyne or dinitrile compound in the presence of copper halide catalyst.

7 Claims, No Drawings

COPOLYCONDENSATION POLYMERIZATION OF FLUOROPOLYMERS

FIELD OF THE INVENTION

This invention relates to a copolycondensation polymerization process for the manufacture of fluorinated copolymers wherein A) a telechelic fluoroazido compound of formula $N_3(Y)_p$—$(CH_2)_n$—R—$(CH_2)_m$—$(Y)_pN_3$, wherein Y is SO, $SO_2$, $C_6H_4$, or CO, p=0 or 1, n and m are independently 1 to 4, and R is selected from the group consisting of i) a $C_3$-$C_{10}$ fluoroalkylene group, ii) a $C_3$-$C_{10}$ fluoroalkoxylene group, iii) a substituted aryl group, iv) an oligomer comprising copolymerized units of vinylidene fluoride and perfluoro(methyl vinyl ether), v) an oligomer comprising copolymerized units of vinylidene fluoride and hexafluoropropylene, vi) an oligomer comprising copolymerized units of tetrafluoroethylene and perfluoro(methyl vinyl ether), and vii) an oligomer comprising copolymerized units of tetrafluoroethylene and a hydrocarbon olefin is reacted with B) a telechelic diyne or dinitrile compound in the presence of copper halide catalyst.

BACKGROUND OF THE INVENTION

Fluoropolymers are typically manufactured in a free radical emulsion, solution or suspension polymerization process from fluoroolefins and fluorovinyl ethers. The types of fluoropolymers that have been made are thus limited to those that can be manufactured by such processes.

The 1,3-dipolar cycloaddition between an azide and an alkyne to result in a 1,2,3-triazole is referred to as the Huisgen reaction. The reaction is among those also referred to as "Click Chemistry" H. C. Kolb, M. G. Finn and K. B. Sharpless Angewandte Chemie International Edition 40(11),2004-2021 (2001).

It would be beneficial to extend Click Chemistry to fluorochemicals so that new fluoropolymers can be manufactured.

SUMMARY OF THE INVENTION

The present invention is a new copolycondensation polymerization process for the manufacture of fluorinated copolymers. Accordingly an aspect of the present invention is a process for the manufacture of fluorinated copolymers comprising:

A) charging a reactor with a nitrogen-based ligand and a copper(I) halide catalyst;

B) adding to the reactor a telechelic fluoroazido compound of formula $N_3(Y)_p$—$(CH_2)_n$—R—$(CH_2)_m$—$(Y)_pN_3$ wherein Y is SO, $SO_2$, $C_6H_4$, or CO, p=0 or 1, n and m are independently 1 to 4, and R is selected from the group consisting of i) a $C_3$-$C_{10}$ fluoroalkylene group, ii) a $C_3$-$C_{10}$ fluoroalkoxylene group, iii) a substituted aryl group, iv) an oligomer comprising copolymerized units of vinylidene fluoride and perfluoro(methyl vinyl ether), v) an oligomer comprising copolymerized units of vinylidene fluoride and hexafluoropropylene, vi) an oligomer comprising copolymerized units of tetrafluoroethylene and perfluoro(methyl vinyl ether), and vii) an oligomer comprising copolymerized units of tetrafluoroethylene and a hydrocarbon olefin;

C) adding to the reactor a telechelic diyne or dinitrile compound; and

D) reacting said fluoroazido compound (B) and said telechelic diyne or dinitrile compound (C) to form a fluorinated copolymer.

DETAILED DESCRIPTION OF THE INVENTION

The present invention is directed to a copolycondensation polymerization process for the manufacture of fluorinated copolymers. By the term "copolycondensation" is meant condensation between reactants leading to new products. In this process, a telechelic fluorinated bisazido compound is reacted with a telechelic diyne or dinitrile (dicyano) compound in the presence of a copper(I) halide catalyst. Optionally, the copper(I) halide may be generated in-situ by reaction of a copper(II) halide with a reducing agent such as ascorbic acid. The polymerization medium is a nitrogen-based ligand such as a bidentate nitrogen complexing agent (e.g. 2,2'-bipyridine), hexamethylene tetramine, 2-pyridinecarbaldehyde alkylimine, multidendate linear polyamines, 1,10-phenanthroline, and 1,1,4,7,10,10-hexamethyltriethylenetetramine.

The telechelic fluorinated bisazido compounds that may be employed in the process of this invention have the formula $N_3(Y)_p$—$(CH_2)_n$—R—$(CH_2)_m$—$(Y)_pN_3$ wherein Y is SO, $SO_2$, $C_6H_4$, or CO, p=0 or 1, n and m are independently 1 to 4, and R is selected from the group consisting of i) a $C_3$-$C_{10}$ fluoroalkylene group, ii) a $C_3$-$C_{10}$ fluoroalkoxylene group, iii) a substituted aryl group, iv) an oligomer comprising copolymerized units of vinylidene fluoride and perfluoro(methyl vinyl ether), v) an oligomer comprising copolymerized units of vinylidene fluoride and hexafluoropropylene, vi) an oligomer comprising copolymerized units of tetrafluoroethylene and perfluoro(methyl vinyl ether), and vii) an oligomer comprising copolymerized units of tetrafluoroethylene and a hydrocarbon olefin. Hydrocarbon olefins include ethylene (E) and propylene (P).

These oligomers (i.e. low molecular weight copolymers) may be prepared according to the processes disclosed in U.S. 20090105435 A1. In these processes $VF_2$ or TFE is iodine transfer copolymerized in the presence of I—$(CF_2)_4$—I. The resulting copolymers are then ethylenated and eventually reacted with $NaN_3$ to yield the diazide telechelic oligomers. Such oligomers preferably contain 10 to 60 mole percent perfluoro(methyl vinyl ether). The oligomers have a number average molecular weight of 1000 to 25,000, preferably 1200 to 12,000, most preferably 1500 to 5000.

Specific examples of oligomers that may be incorporated by the process of this invention include, but are not limited to TFE/PMVE, $VF_2$/PMVE, $VF_2$/TFE/PMVE, TFE/PMVE/E, $VF_2$/HFP, $VF_2$/HFP/TFE, TFE/P and TFE/P/$VF_2$.

Telechelic diyne or dinitrile (dicyano) compounds that may be employed in the process of this invention include, but are not limited to NC—$(CF_2)_n$—CN (n=2-20), see U.S. Pat. No. 2,515,246 and Journal of Industrial and Engineering Chemistry (Washington, D.C.) (1947), 39, 415-17; and HC≡C—$(CF_2)_n$—C≡CH(n=2-20), see K. Baum, et al., J. Org. Chem., 47, 2251 (1982).

The polymerization reaction may be run at a temperature between 15° C. and 100° C. (preferably between 20° C. and 80° C.) and at a pressure between 0.1 and 7 MPa (preferably between 0.1 and 0.7 MPa).

An example of the copolycondensation polymerization reaction is

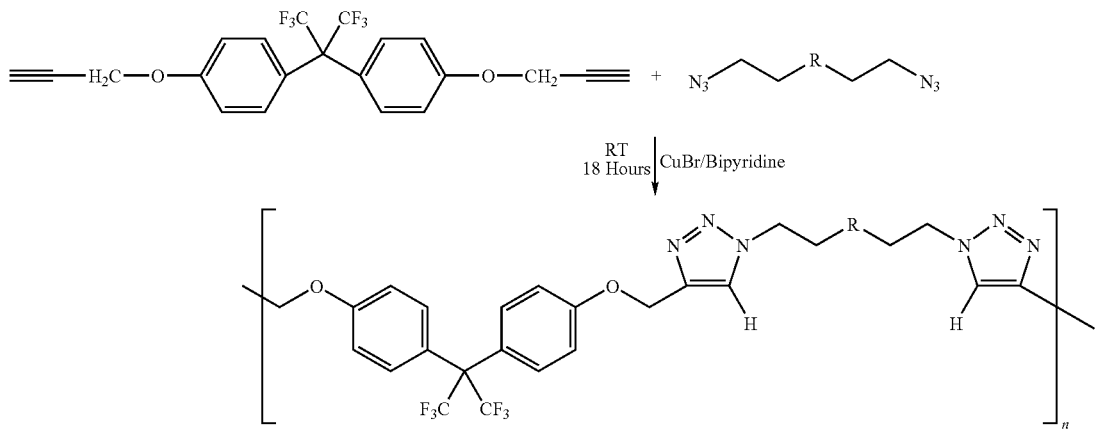

In the above, R is the same as that defined in the telechelic fluorinated bisazido compound formula. Although CuBr is shown as the catalyst in the above reaction, any copper(I) halide may be employed.

Copolymers made by the copolycondensation process of this invention have a number average molecular weight between 5000 and 200,000, preferably 10,000 to 100,000.

These copolymers are useful in many industrial applications including sealants, O-rings, shaft seals for use in the automotive, aerospace and the electronics industries.

EXAMPLES

Test Methods

Nuclear Magnetic Resonance Spectroscopy:

The compositions and the structures of the fluoropolymers obtained by copolycondensation were determined by $^{19}F$ and $^{1}H$ NMR spectroscopy. The NMR spectra were recorded on BRUKER® AC 250, or AC400 (250 and 400 MHz) instruments, using deuterated acetone as the solvent and tetramethylsilane (TMS) (or $CFCl_3$) as the references for $^{1}H$ (or $^{19}F$) nuclei. Coupling constants and chemical shifts are given in Hz and ppm, respectively. The experimental conditions for $^{1}H$ (or $^{19}F$) NMR spectra were the following: flip angle 90° (or 30°), acquisition time 4.5 s (or 0.7 s), pulse delay 2 s (or 5 s), number of scans 16 (or 128), and a pulse width of 5 μs for $^{19}F$ NMR.

Chromatography:

Size Exclusion Chromatography (SEC) was performed with a Spectra-Physics apparatus equipped with two PLgel 5 μm Mixed-C columns from Polymer Laboratories and a Spectra Physics SP8430 RI detector. Dimethylformamide (DMF) was the eluent, temperature was 30° C. and flow rate was 0.8 mL min$^{-1}$. Poly(styrene) or poly(methylmethacrylate) standards (Polymer Laboratories) were used to give relative values of the molecular weights. Samples of a known concentration (ca. 2 wt. %) were filtered through a 200 micron PTFE chromafil membrane prior to injection.

Thermal Properties:

The glass transition temperatures ($T_g$) were determined by differential scanning calorimetry (DSC) using a Perkin Elmer Pyris 1 apparatus calibrated with indium and n-decane. The samples (about 10 mg) were initially cooled to −105° C. for 10 minutes (min.), then heated from −100° to 50° C. at a heating rate of 20° C./min. (a second recooling was done to −105° C., and the same cycle repeated three times). The values of $T_g$ reported herein correspond to the inflection point of the differential heat flow.

TGA analyses were performed using a Texas Instrument ATG 51-133 apparatus under air at the heating rate of 20° C./min from room temperature (approximately 20° C.) up to 550° C.

The following bisazido compounds were employed in the examples:

1. Telechelic Bis(azido) Poly($VF_2$-co-PMVE) Copolymer. This was synthesized in a multistage process from perfluoro (methyl vinyl ether) (PMVE) and vinylidene fluoride ($VF_2$).

A one gallon Hastelloy (HC-276) autoclave, equipped with inlet and outlet valves, a manometer and a rupture disc, was degassed and pressurized with 3.0 MPa of nitrogen for 2 hours to check for leaks. After this operation, a 2.67 kPa vacuum was applied for 30 minutes (min.) to eliminate oxygen residue. Under vacuum, the autoclave was loaded with a pre-prepared solution.

Pre-prepared solution: $Na_2S_2O_8$ (7.36 g, 0.031 mol), 1,4-diiodoperfluorobutane ($IC_4F_8I$) (143 g, 0.315 mol), and deionized water (1.6 kg) were mixed and then bubbled with argon for 20 min. at 0° C. to eliminate the oxygen residue in the reaction mixture.

After the addition of the pre-prepared solution to the autoclave, the monomers were introduced by a gas transfer of perfluoro(methyl vinyl ether) (PMVE) (332 g, 2.0 mole) and vinylidene fluoride ($VF_2$) (192 g, 3.0 mole). The molar ratio $VF_2$/PMVE of the feed was 60/40. To facilitate the introduction of PMVE, the autoclave was cooled to about −40° C. in a dry ice/acetone bath. A small increase in the reactor pressure was observed (from 0 to 0.2 MPa) during the introduction of PMVE. The autoclave was then warmed to room temperature. Pressure in the autoclave increased from 0.2 to 0.5 MPa. Next $VF_2$ was introduced at room temperature. The pressure in the autoclave increased quickly (from 0.5 to 2.0-2.5 MPa). After the introduction of $VF_2$, the mixture was mixed for 10 min. without heating (agitation speed=900 rpm). The pressure in the autoclave slowly decreased (from 2.5 to 1.5 MPa). The autoclave was then slowly heated to 80° C. in stages in order to avoid a sudden exotherm (ca. 20° C.). Such a large exotherm would decrease the yield of the reaction. When the pressure reached 4.0-4.5 MPa, a small exotherm was observed (ca. 5° C.) and then a sharp drop in pressure was observed (from 4.5 to 0.5 MPa). The reaction was allowed to proceed for 8 hours. The autoclave was then placed in an ice bath for about 60 min. and the unreacted gas was slowly released. About 2150-2200 g of liquid was obtained from the depressurized autoclave. Excess monomer that had dissolved in the liquid was released under vacuum (20 mm Hg). The liquid was twice extracted with 2,3-dihydroperfluoropentane and washed with water to eliminate any traces of $Na_2S_2O_8$.

The extracts were dried over MgSO₄. Solvent was removed by distillation (ambient temperature/20 mm Hg), to obtain a clear, viscous, slightly pink product (yield=90-95%). To eliminate residual iodine, the liquid was washed with a solution of sodium thiosulfate (5 wt. % in water). The resulting oligomer product was colorless.

The oligomer was characterized by $^{19}$F and $^{1}$H NMR spectroscopy and SEC analysis as described in the Test Methods. The number average molecular weight was 2410 g/mol (by $^{19}$F NMR); 2765 g/mol (by SEC) and had a polydispersity index (PDI) of 1.147. The composition of the oligomer was 73.4 mol % VF₂ and 26.6 mol % PMVE. The glass transition temperature (Tg) was −55° C., and the decomposition temperature (Td) was 220° C.

The above oligomer was ethylenated by the following procedure. A 160-mL Hastelloy (HC-276) autoclave, equipped with inlet and outlet valves, a manometer and a rupture disc, was degassed and pressurized with 30 bar of nitrogen to check for leaks. Then, a 0.5 mm Hg vacuum was pulled for 5 min. and subsequently an Ar atmosphere was applied. This degassing procedure of the autoclave was repeated five times. Under vacuum, 5.0 g (2.87×10⁻² mol) of t-butylperoxypivalate (TBPPi), 50 mL of t-butanol and 100.0 g (0.077 mol) of the poly(VDF-co-PMVE) oligomer prepared above were transferred into the autoclave. 6.0 g of ethylene (0.214 moles) was introduced into the autoclave. Then, the autoclave was progressively heated to 75° C. An exotherm of ca. 10° C. was observed and an increase of pressure from 15 bars up to 18 bars, followed by a drop of pressure to 14 bars in 16 hours. After reaction, the autoclave was placed in an ice bath for about 60 minutes and 0.5 g of unreacted ethylene was slowly released. After opening the autoclave, the reaction mixture was dissolved in 100 ml of 2-butanone (MEK) and washed with distilled water (2×100 ml), Na₂S₂O₅ solution (100 ml) and brine (100 ml) respectively in a separating funnel. Then, the organic phase was dried over MgSO₄ and filtered through sintered glass (G4). The organic solvent was removed by a rotating vacuum evaporator at 40° C. under a vacuum of about 10 mm Hg. The resulting slightly yellow viscous liquid was dried at 40° C. under 0.01 mbar pressure to constant weight. The yield of the reaction was 91%. The product was analyzed by $^{1}$H NMR and $^{19}$F NMR spectroscopy. An absence of the signal corresponding to the terminal —CF₂I (approximately −39 ppm) signal indicated quantitative conversion of I[(VDF)$_x$PMVE]$_y$—C₄F₈[PMVE(VDF)$_z$]$_q$I to ICH₂CH₂—[(VDF)$_x$PMVE]$_y$—C₄F₈[PMVE(VDF)$_z$]$_q$—CH₂CH₂I.

This ethylenated oligomer was then reacted with sodium azide to form the telechelic bis(azido) poly(VF₂-co-PMVE) copolymer. The nucleophilic substitution of 2.03 g (1.3 mmol) of ethylenated diiodo poly(VDF-co-PMVE) oligomer with 2.70 g (4.0 mmol) of sodium azide was carried out in a round bottom flask containing 20 mL of DMSO at 50° C. for 12 hours. Then, the diazido dissolved with diethyl ether was precipitated from water, washed 5 times with distilled water and dried over magnesium sulfate. After drying under vacuum, 1.22 g (0.9 mmol) of a viscous yellow oil was obtained, a 70% yield of N₃CH₂CH₂—[(VDF)$_x$PMVE]$_y$—C₄F₈[PMVE(VDF)$_z$]$_q$—CH₂CH₂N₃.

2. Telechelic 1,10-Diazido-1H, 1H,2H,2H,9H,9H,10H,10H-Perfluorodecane. This was synthesized in a multistage process from α,ω-diiodoperfluorohexane.

The batch bismonoaddition of α,ω-diiodoperfluorohexane onto ethylene was performed in a 160 mL Hastelloy (HC276) autoclave Parr System, equipped with a manometer, a rupture disk, inlet and outlet valves, and a mechanical anchor. An electronic device regulated and controlled both the stirring and the heating of the autoclave. The autoclave was left closed for 20 min. and purged with 30 bars of nitrogen pressure to prevent any leakage, and degassed afterwards. Then, a 2 mm Hg vacuum was operated for 15 min. The initiator di-4-tert-butylcyclohexyl peroxydicarbonate (4.22 g, 10 mmol) and 30.13 g (54.2 mmol) of I—C₆F₁₂—I in dry tert-butanol (40 mL) were introduced via a funnel tightly connected to the introduction valve. Next, ethylene (4.0 g, 0.14 mol) was introduced by double weighing. The autoclave was then heated up to 50° C. for 7 hours. After reaction, the autoclave was cooled to room temperature and then put into an ice bath. After degassing the unreacted monomer, the autoclave was opened. Tert-butanol was evaporated; the monomer was solubilized in THF and precipitated from cold pentane. The fluorinated diiodo product was filtered, washed, and dried at room temperature under a 20mmHg vacuum for 24 hrs. The yield was 80%. FT-IR: 1138 cm⁻¹ ($v_{C-F}$)

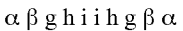
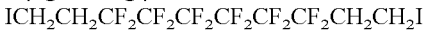

ICH₂CH₂CF₂CF₂CF₂CF₂CF₂CF₂CH₂CH₂I
$^{1}$H-NMR (δ CDCl₃) α: 3.2 ppm (t, $^{3}J_{HH}$=7.01 Hz, 4H); β: 2.6 ppm (m, 4H);
$^{19}$F-NMR (δ CDCl₃) g: −115.2 ppm (m, 4F); h: −121.8 ppm (m, 4F); i: −123.8 ppm (m, 4F).

A mixture composed of 7.80 g (12.8 mmol) of 1,10-diiodo-1H,1H,2H,2H,9H,9H,10H,10H-perfluorodecane (prepared above) and 2.21 g (30.8 mmol) sodium azide dissolved in DMSO (25 mL) and water (1 mL) was stirred at 50° C. for 48 hours. Then, the reaction mixture was poured into water and was extracted with diethyl ether. This procedure was repeated twice. The organic layer was washed with water twice, then with 10% sodium sulfite solution twice, water again (3 times) and brine, dried over MgSO₄, filtered and then the solvent was evaporated under reduced pressure to give 5.0 g of a pale green oil. The yield of the fluorinated diazide was 94%.

FT IR: 2100 cm⁻¹ ($v_{N3}$); 1138 cm⁻¹ ($v_{C-F}$)

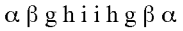
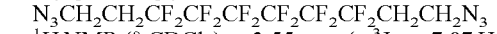

N₃CH₂CH₂CF₂CF₂CF₂CF₂CF₂CF₂CH₂CH₂N₃
$^{1}$H NMR (δ CDCl₃) α: 3.55 ppm (t, $^{3}J_{HH}$=7.07 Hz, 4H), β: 2.30 ppm (m, 4H)
$^{19}$F NMR (δ CDCl₃) g: −114.2 ppm (m, 4F); h: −121.8 ppm (m, 4F); i: −123.8 ppm (m, 4F)

3. Telechelic 1,10-Diazido-3-Trifluoromethyl-3,4,4,5,5,7,8,8-Nonafluorodecane. This was synthesized in a multi-step process from I—(C₂F₄)—(CH₂CF₂)—CF₂CF(CF₃)—I (B. Ameduri et al., J. Fluorine Chem., 78, 145 (1996)).

A 160-mL Hastelloy (HC-276) autoclave, equipped with inlet and outlet valves, a manometer and a rupture disc, was degassed and pressurized with 30 bar of nitrogen to check for leaks. Then, a 0.5 mm Hg vacuum was pulled for 5 min. and subsequently an Ar atmosphere was applied. This degassing procedure of the autoclave was repeated five times. Di-4-t-butylcyclohexyl peroxydicarbonate (0.60 g, 15 mmol) and I—(C₂F₄)—(CH₂CF₂)—CF₂CF(CF₃)—I (21.01 g, 37 mmol) in dry tert-butanol (40 mL) were introduced via a funnel tightly connected to the introduction valve. Next, ethylene (2.00 g, 74 mmol) was added. The autoclave was then heated up to 50° C. for 7 hours. After reaction, the autoclave was cooled to room temperature and then put into an ice bath. After degassing the unreacted monomer, the autoclave was opened and the total product mixture was distilled leading to 12.7 g (20 mmol) of a red liquid; b.p. 69-72° C./19 mm Hg. The yield was 60%. FT IR: 1138 cm⁻¹ ($v_{C-F}$)

ICH₂CH₂(CF₂CF₂)(CH₂CF₂)[(CF₂CF)(CF₃)]CH₂CH₂I

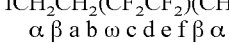
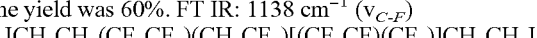

$^{1}$H NMR (δ CDCl₃) α: 3.2 ppm (t, 4H, $^{3}J_{HH}$=7.05HZ), ω: 2.8 ppm (qi, 2H) ($^{3}J_{HF}$=15.20 Hz); β: 2.8 ppm (m, 4H);
$^{19}$F NMR (δ CDCl₃) a: −115.2 ppm (m, 2F); b:−13.2 ppm (m, 2F); c: −111.2 ppm (m, 2F); d: −118.0 ppm (m, 2F); e: −181.8 ppm (m, 1F); f: −73.9 ppm (m, 3F).

A mixture comprised of 3.70 g (6.0 mmol) of the 1,10-diiodo-3-trifluoromethyl-3,4,4,5,5,7,7,8,8-nonafluorodecane (prepared above) and 1.21 g (18.0 mmol) sodium azide dissolved in DMSO (25 mL) and water (0.5 mL) was stirred at 50° C. for 48 hours. Then, the reaction mixture was poured into water and was extracted with diethyl oxide. This procedure was repeated twice. The organic layer was washed with water twice, then with 10% sodium sulfite solution twice, water again (3 times) and brine, dried over MgSO$_4$, filtered and then the solvent was evaporated under vacuum ($10^{-2}$ mm Hg) for 4 hours to give 2.3 g of a pale green oil. The yield of the fluorinated diazide containing TFE, VDF an HFP base units was 90%.

FT IR: 2100 cm$^{-1}$ ($v_{N3}$); 1138 cm$^{-1}$ ($v_{C-F}$).
N$_3$CH$_2$CH$_2$(CF$_2$CF$_2$)(CH$_2$CF$_2$)[CF$_2$CF(CF$_3$)]CH$_2$CH$_2$N$_3$:
α β a b ω c d e f β α
$^1$H NMR (δ CDCl$_3$) α: 3.5 ppm (t, 4H, $^3J_{HH}$=7.0 Hz); ω: 2.8 ppm (qi, 2H, $^3J_{HF}$=16.0 Hz);
β: 2.2 ppm (m, 4H);
$^{19}$F NMR (δ CDCl$_3$) a: −114.2 ppm (m, 2F); b:−13.2 ppm (m, 2F); c: −111.2 ppm (m, 2F); d: −118.0 ppm (m, 2F); e: −181.8 ppm (m, 1F); f: −73.9 ppm (m, 3F).

The following diyne was employed in the examples:
1. α,ω-Dipropargyl Ether Bisphenol AF. It was synthesized as described below.

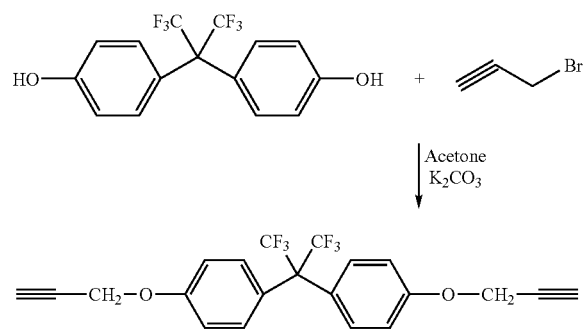

To a flame dried 250 mL three-neck round-bottom flask were charged propargyl bromide (10.05 g, 53.7 mmol), bisphenol AF (12.80 g, 107.4 mmol) and anhydrous potassium carbonate (20.70 g, 150 mmol). The flask was flushed with nitrogen and then acetone (20 mL) was added via a syringe. The mixture was stirred at room temperature for 12 hours. The resulting solution was poured into diethyl ether (20 mL) and brine (200 mL). The organic layer was separated and washed twice with brine (100 mL each time), dried over MgSO$_4$, filtered, and concentrated under reduced pressure to give the aromatic telechelic diyne (11.13 g, 26.7 mmol), Yield=50%. FT-IR: 3300 cm$^{-1}$ ($v_{C≡CH}$) 1138 cm$^{-1}$ ($v_{C-F}$).

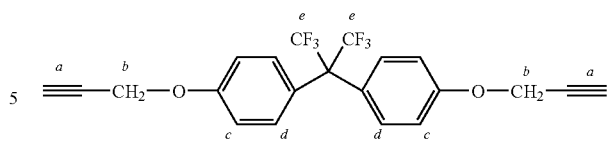

$^1$H-NMR (δ Acetone d6) a: 3.1 ppm (s, 2H); b: 4.8 ppm (s, 4H); c, d: 7.3-7.4 ppm (d, $^3J_{HH}$=8.09 Hz, 8H); $^{19}$F NMR (δ Acetone d6) e: −63.2 ppm (m, 6F).

Example 1

In this example, the process of the invention was employed to manufacture a copolymer of telechelic bis(azido)poly (VF$_2$-co-PMVE) copolymer with telechelic α,ω-dipropargyl ether bisphenol AF. In a three-necked round bottom flask equipped with a condenser, 47 mg (0.3 mmol) of CuBr, 272 mg of bipyridine and 20 ml of THF were mixed. The mixture was purged with argon for 10 minutes in order to avoid excess oxidation of the Cu(I). 1.02 g (0.7 mmol) of the telechelic diazido poly(VDF-co-PMVE) copolymer (prepared above) was added followed by 0.305 g (0.7 mmol) of telechelic α,ω-dipropargyl ether bisphenol AF (prepared above). The reaction was stirred at 50° C. for approximately 24 hours. Copper was separated from the mixture using a silica column. The final product was precipitated from diethyl ether and dried at 40° C. for 6 hours, under vacuum. A white viscous liquid was obtained (0.9 g). The yield was 70%.

Example 2

In this example, the process of the invention was employed to manufacture poly(1,10-ditriazolo-1H,1H,2H,2H,9H,9H,10H,10H-perfluorodecane-co-methyleneetherhexafluorobisphenol AF) copolymer. To a 100 mL three-neck round bottom flask equipped with a magnetic stirrer, were charged copper bromide (100 mg, 0.66 mmol) and 2,2'-bipyridine (dNbipy) (248 mg, 1.32 mmol). The flask was then sealed with three septum. The suspension was purged with dry nitrogen for 20 min. Reactants prepared above—1,10-diazido-1H, 1H,2H,2H,9H,9H,10H,10H-perfluorodecane (2.01 g, 4.54 mmol) and α,ω-dipropargyl ether bisphenol AF (1.18 g, 4.54 mmol) in 20 mL THF were added through a septum via a syringe. The resulting mixture was stirred at room temperature for 48 hours. Degassed DMF (20 mL) was then added to solubilize the polymer. The final mixture was passed through a short silica column to remove copper catalyst. The mixture was precipitated from cold diethyl ether (500 mL). The precipitate was dried under vacuum to give 1.5 g of a colorless gum (Yield=60%). FT IR: 3135 cm$^{-1}$ ($v_{C≡CH}$); 1138 cm$^{-1}$ ($v_{C-F}$).

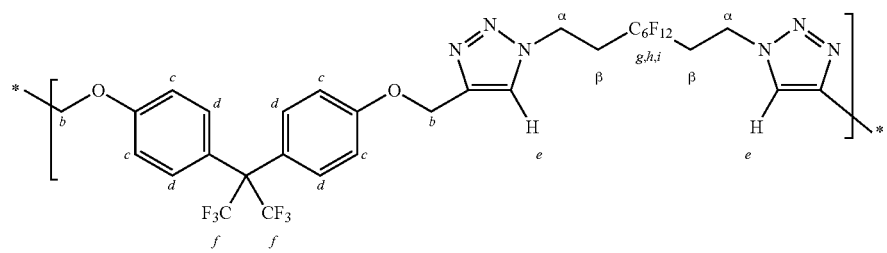

$^1$H NMR (δ DMSO): β: 3.05 ppm (m, 4H), α: 4.90 ppm (t, 4H, $^3J_{HH}$=7.07 Hz), b: 5.3 ppm (s, 4H), c: 7.4 ppm (d, 4H, $^3J_{HH}$=6.90 Hz); d: 7.2 ppm (d, 4H, $^3J_{HH}$=7.01 Hz); e: 8.4 ppm (s, 2H);

$^{19}$F NMR (δ DMSO): f: −65 ppm (s, 6F), g: −114 ppm (m, 4F), h: −122 ppm (m, 4F), i: −124 ppm (m, 4F).

SEC Analysis in DMF: Mn: 34,000 g/mol; PDI: 1.5

TGA Analysis under air: $T_{5\% \ wt \ loss}$: 300° C.; $T_{10\% \ wt \ loss}$: 310° C.

DSC Analysis: Tg1=95° C.; Tg2=155° C.

Intrinsic viscosity: 0.7 dL/g (measured in N,N-dimethylformamide @25° C.)

Example 3

In this example, the process of the invention was employed to manufacture poly(α,ω-ditriazolo-1,10-diazido-3-trifluoromethyl-3,4,4,5,5,7,7,8,8-nonafluorodecane-co-methyleneetherhexafluorobisphenol AF) copolymer. 1,10-diazido-3-trifluoromethyl-3,4,4,5,5,7,7,8,8-Nonafluorodecane is sometimes referred to as TFE/VF$_2$/HFP.

Copper bromide (100 mg, 0.66 mmol) and 2,2'-bipyridine (dNbipy) (248 mg, 1.32 mmol) were charged into a 100 mL three-neck round bottom flask equipped with a magnetic stirrer, which was then sealed with three septum. The suspension was purged with dry nitrogen for 30 min. Telechelic 1,10-diazido-3-trifluoromethyl-3,4,4,5,5,7,7,8,8-nonafluorodecane (prepared above) (2.25 g, 2.2 mmol) and telechelic α,ω-dipropargyl ether bisphenol AF (prepared above) (0.92 g, 2.2 mmol) in 20 mL THF were added through the septum via a syringe. The resulting mixture was stirred at room temperature for 48 hours. The final mixture was passed through a short silica column to remove the copper catalyst. The mixture was precipitated from cold diethyl ether (500 mL). The precipitate was filtered and dried under vacuum to give 3.04 g of a red powder (Yield=70%). FT IR: 3135 cm$^{-1}$ ($v_{C≡CH}$); 1138 cm$^{-1}$ ($v_{C-F}$).

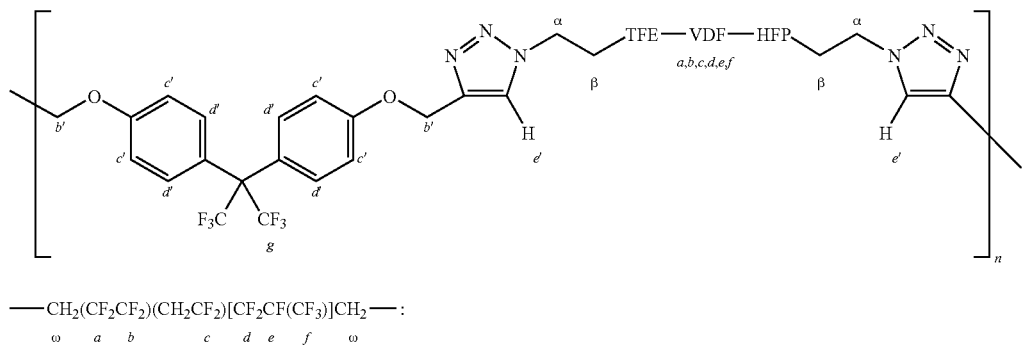

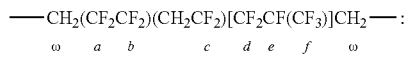

$^1$H NMR (δ CDCl$_3$) α: 4.8 ppm (t, 4H, $^3J_{HH}$=7.05 Hz), ω: 2.8 ppm (qi, 2H, $^3J_{HF}$=15.01 Hz); β: 3.0 ppm (m, 4H); b' 5.3 ppm (s, 4H), c':7.4 ppm (d, 4H, $^3J_{HH}$=6.90 Hz); d':7.2 ppm (d, 4H, $^3J_{HH}$=7.01 Hz); e': 8.4 ppm (s, 2H);

$^{19}$F NMR (δ CDCl$_3$) a: −115.2 ppm (m, 2F); b:−13.2 ppm (m, 2F); c: −111.2 ppm (m, 4F); d: −118.0 ppm (m, 2F); e: −181.8 ppm (m, 1F); f: −73.9 ppm (m, 3F); g: −63.5 ppm (s, 6F).

SEC Analysis in DMF: Mn: 26,000 g/mol; PDI: 1.6

TGA Analysis under air: $T_{5\% \ wt \ loss}$: 300° C.; $T_{10\% \ wt \ loss}$: 310° C.

DSC Analysis: $α_c$=65° C.

What is claimed is:

1. A process for the manufacture of fluorinated copolymers comprising:
    A) charging a reactor with a nitrogen-based ligand and a copper (I) halide catalyst;
    B) adding to the reactor a telechelic fluoroazido compound of formula N$_3$(Y)$_p$—(CH$_2$)$_n$—R—(CH$_2$)$_m$—(Y)$_p$N$_3$ wherein Y is SO, SO$_2$, C$_6$H$_4$, or CO, p=0 or 1, n and m are independently 1 to 4, and R is selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin;
    C) adding to the reactor a telechelic diyne or dinitrile compound; and
    D) reacting said fluoroazido compound (B) and said telechelic diyne or dinitrile compound (C) to form a fluorinated copolymer.

2. A process of claim 1 wherein said copper(I) halide catalyst is generated from reaction of a copper(II) halide with a reducing agent.

3. A process of claim 1 wherein said nitrogen based ligand is selected from the group consisting of 2,2'-bipyridine, hexamethylene tetramine, 2-pyridinecarbaldehyde alkylimine, multidendate linear polyamines, 1,10-phenanthroline, and 1,1,4,7,10,10-hexamethyltriethylenetetramine.

4. A process of claim 1 wherein said oligomers have a number average molecular weight between 1000 and 25,000.

5. A process of claim 4 wherein said oligomers have a number average molecular weight between 1500 and 5,000.

6. A process of claim 1 wherein said telechelic dinitrile is of the formula NC—(CF$_2$)$_n$—CN wherein n is an integer between 2 and 20.

7. A process of claim 1 wherein said telechelic diyne is selected from the group consisting of HC≡C—(CF$_2$)$_n$—C≡CH wherein n is an integer between 2 and 20; and α,ω-dipropargyl ether bisphenol AF.

* * * * *